US006637846B2

(12) United States Patent
Yang

(10) Patent No.: US 6,637,846 B2
(45) Date of Patent: Oct. 28, 2003

(54) EXIT APPARATUS FOR COMPUTER MODULES

(75) Inventor: Chun-Fei Yang, Hsi Chih (TW)

(73) Assignees: Wistron Corporation, Taipei Hsien (TW); Acer Incorporated, Taipei Hsien (TW)

(*) Notice: Subject to any disclaimer, the term of this patent is extended or adjusted under 35 U.S.C. 154(b) by 0 days.

(21) Appl. No.: 10/067,256

(22) Filed: Feb. 7, 2002

(65) Prior Publication Data
US 2002/0145366 A1 Oct. 10, 2002

(30) Foreign Application Priority Data
Apr. 4, 2001 (TW) ........................... 90108081 A

(51) Int. Cl.[7] .............................................. A47B 97/00
(52) U.S. Cl. ............... 312/223.2; 248/27.3; 312/223.1; 361/686
(58) Field of Search .................. 312/223.2, 223.1, 312/319.1, 215, 222; 361/686, 683; 403/322.1; 248/27.1, 27.3

(56) References Cited
U.S. PATENT DOCUMENTS

| 5,208,116 A | * | 5/1993 | Joh ............................ 429/96 |
| 5,220,520 A | * | 6/1993 | Kessoku ..................... 361/684 |
| 5,510,957 A | * | 4/1996 | Takagi ........................ 361/814 |
| 5,823,644 A | * | 10/1998 | Suh et al. ................. 312/223.2 |
| 6,129,430 A | * | 10/2000 | Wu .......................... 312/223.2 |
| 6,450,727 B2 | * | 9/2002 | Lu ............................ 403/322.1 |
| 6,490,155 B2 | * | 12/2002 | Han et al. ................... 361/686 |
| 6,510,051 B2 | * | 1/2003 | Kim ............................ 361/686 |

* cited by examiner

Primary Examiner—Anita King
Assistant Examiner—Tan Le
(74) Attorney, Agent, or Firm—Winston Hsu

(57) ABSTRACT

The present invention relates to an exit apparatus for computer modules, including a first lever that connects with a first elastic member; and a second lever that connects with a second elastic member. The second lever with the elasticity of the second elastic member hooks the first lever. And then, by pushing the second lever to release the first lever and the first lever is pushed forward by the elasticity of the first elastic member. When the user pushes the second lever horizontally, the first lever hooks the module and the module is pulled out with a short distance. The user can fully retrieve the module by pulling the first lever. The present invention replaces the conventionally complicated exit apparatus with simple mechanism, thus effectively reducing the manufacturing process, and lowering the production cost.

8 Claims, 6 Drawing Sheets

EXIT APPARATUS FOR COMPUTER MODULES

REFERENCE TO RELATED APPLICATION

This application claims the benefit of priority under 35 U.S.C. §119(a) of Taiwan Patent Application No. 090108081, titled "Exit Apparatus for Computer Modules", filed on Apr. 4, 2001.

BACKGROUND OF THE INVENTION

1. Field of the Invention

The present invention relates to an exit apparatus for computer modules, and more particularly to an exit apparatus for computer modules that simplify the conventionally complicated exit apparatus to effectively reduce the manufacturing process, increase the sensitivity, and prevent elastic elements from fatigue.

2. Description of Related Art

Based upon the prior art, a module-loading tray is disposed in a computer or other audio/video products to provide an electric loop that connects modules or cartridges with the mainframe. However, users have to manually insert modules in the module-loading tray when operating the modules, and manually retrieve modules out of the module-loading tray after finishing the operation. The design of manually inserting and retrieving modules not only leads to inconvenient operation, but also makes the modules and mainframes susceptible to damage.

Consequently, improvements have been made regarding the design of module-loading tray with an exit apparatus for inserting and retrieving modules more conveniently. FIG. 1 shows a conventional exit apparatus 1 in a notebook computer. The exit apparatus 1 disposed in the module-loading tray 10 of the computer comprises a first lever 11, a first elastic member 12, a second lever 13 and a second elastic member 14. One end of the first elastic member 12 joins a lug 110 located on the underside of the first lever 11 and forms a free end; the other end of the first elastic member 12 joins a lug 100 located on the module-loading tray 10 and forms a fixed end. The first lever 11 is held within a sliding groove 102, which constrains the motion of the first lever 11 to forward and backward direction. A laminated spring 111 is disposed on the left side of the first lever 11, and two sliding rails 103 and 104 are formed on the left side of the sliding groove 102 with a divider 105 dividing the sliding rail 103 and 104. When the first lever 11 is pushed along the sliding groove 102 toward direction A, the laminated spring 111 is channeled by the divider 105 to slide through the sliding rail 103; on the other hand, when the first lever 11 is pulled out of the sliding groove 102 toward direction B, the divider 105 thus channels the laminated spring 111 to slide through the sliding rail 104.

One end of the second elastic member 14 joins a lug 130 located on the second lever 13 and forms a free end; the other end of the second elastic member 14 joins a lug 101 located on the module-loading tray 10 and forms a fixed end. The second lever 13 is held within a sliding groove 102, which constrains the motion of the second lever 13 to left and right direction.

When the first lever 11 receives a pushing force in direction A, it receives at the same time an elastic recoiling force in direction B from the first elastic member 12 since the first elastic member 12 is extended. Meanwhile, since one end of the second elastic member 14 is fixed by the lug 101 of the module-loading tray 10 and the other end of the second elastic member 14 is compressed by the lug 130 of the second lever 13 toward direction D, there exists an elastic recoiling force in direction C. Therefore, a hook 131 on the right side of the second lever 13 moves toward left and finally hooks a concavity 112 on the right side of the first lever 11, and then the exit apparatus 1 achieves a state of equilibrium.

As shown in FIG. 1, a module 15 has a concavity 151 on one side, when the user pushes a protruding section 132 of the second lever 13 to move the second lever 13 toward direction D, the hook 131 is released from the concavity 112 of the first lever 11. Therefore, the first lever 11 is released and slides toward direction B, then the laminated spring 111 slides through the sliding rail 104 and hooks on the concavity 151 of the module 15, and then the user can pull the first lever 11 and bring out the module 15 from the module-loading tray 10.

In conclusion, the foregoing exit apparatus 1 contains parts with complicated structures, thus raising the production cost considerably, and leading to difficult maintenance. Furthermore, when the exit apparatus 1 of prior art is under the state of equilibrium, the elastic members therein are kept extended, a condition that causes the elastic members to lose elasticity and sensitivity in the long run. Eventually, the modules might not even be able to be pulled out when released.

SUMMARY OF THE INVENTION

The primary object of the present invention is to provide an exit apparatus for computer modules, particularly an exit apparatus, disposed in module-loading trays of computers or other audio/video products. The exit apparatus includes a first lever that connects with a first elastic member, and a second lever that connects with a second elastic member. The two ends of the first elastic member are joined with the first lever and the module-loading tray respectively, thus the first lever is able to move rectilinearly within a sliding groove of the module-loading tray by the pulling force of the first elastic member. The two ends of the second elastic member are joined with the second lever and the module-loading tray respectively, thus the second lever is able to move horizontally within another sliding groove of the module-loading tray by the pulling force of the first elastic member.

Another object of the present invention is to provide an exit apparatus for computer modules, wherein the rear end of the first lever buckles loosely with a dragging plate, whereof the rear end forms a hooking section. When a module is placed inside the module-loading tray, the hooking section at the end of the dragging plate comes in contact with the module and the module is pushed backwards along with the dragging plate, to the inside of the module-loading tray. At this time the user pushes the first lever into the module-loading tray, the first elastic member is under compression and the protruding section of the second lever locks with the concavity of the first lever, thus achieving the state of equilibrium. When the protruding section of the second lever is pulled out of the concavity of the first lever, the first elastic member is released, thus generating an elastic recoiling force that the first lever is moved for a short distance, and when the first lever is pulled out and the dragging plate is pulled out accordingly, thus the user can retrieve a module from the module-loading tray.

BRIEF DESCRIPTION OF THE DRAWINGS

These and other features, aspects and advantages of the present invention will become better understood with regard to the following description, appended claims and accompanying drawings where:

DETAILED DESCRIPTION OF THE PREFERRED EMBODIMENTS

Figure 1:
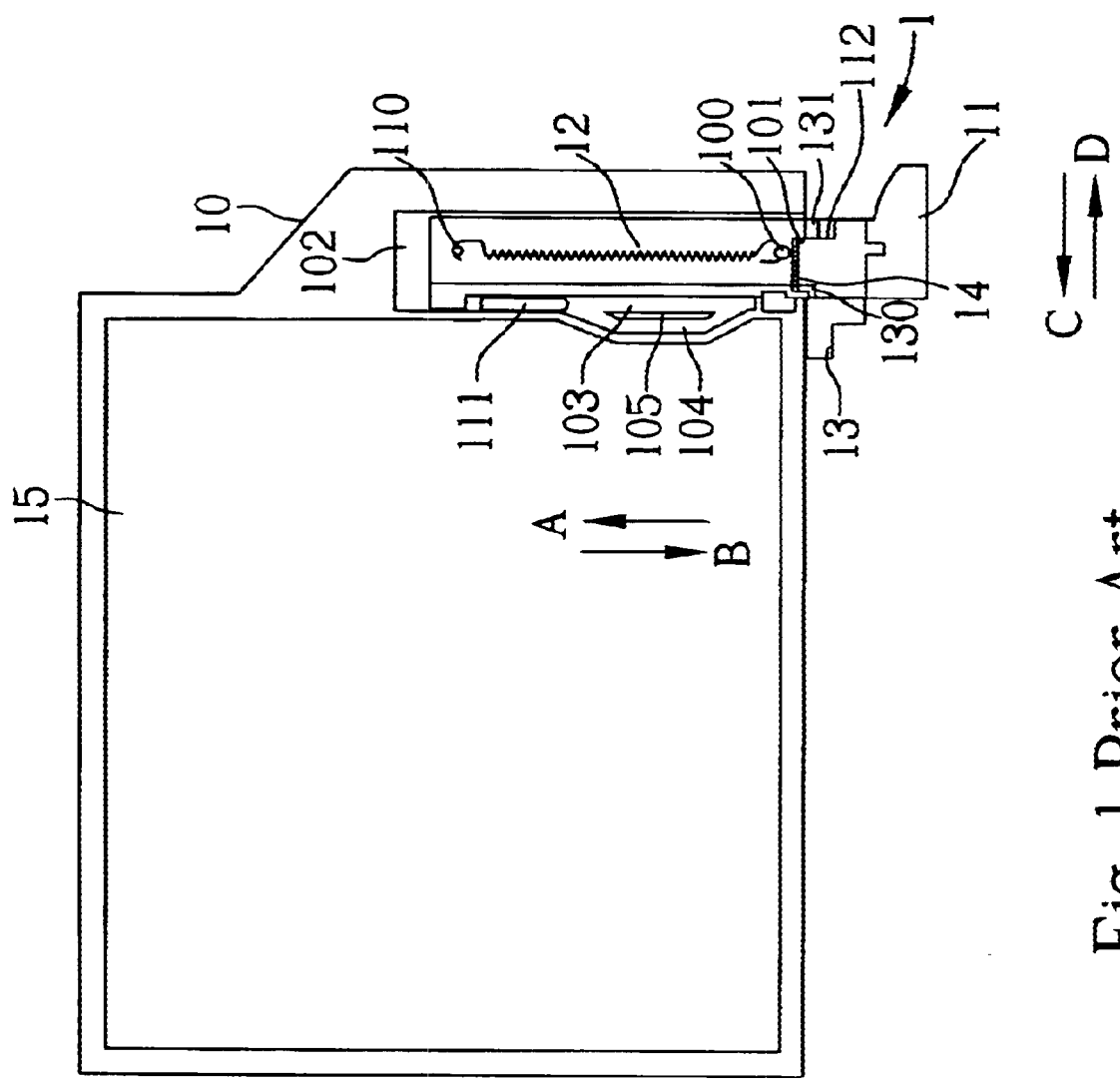
FIG. 1 is a top-plan view of an exit apparatus for computer modules in prior art.
Figure 2:
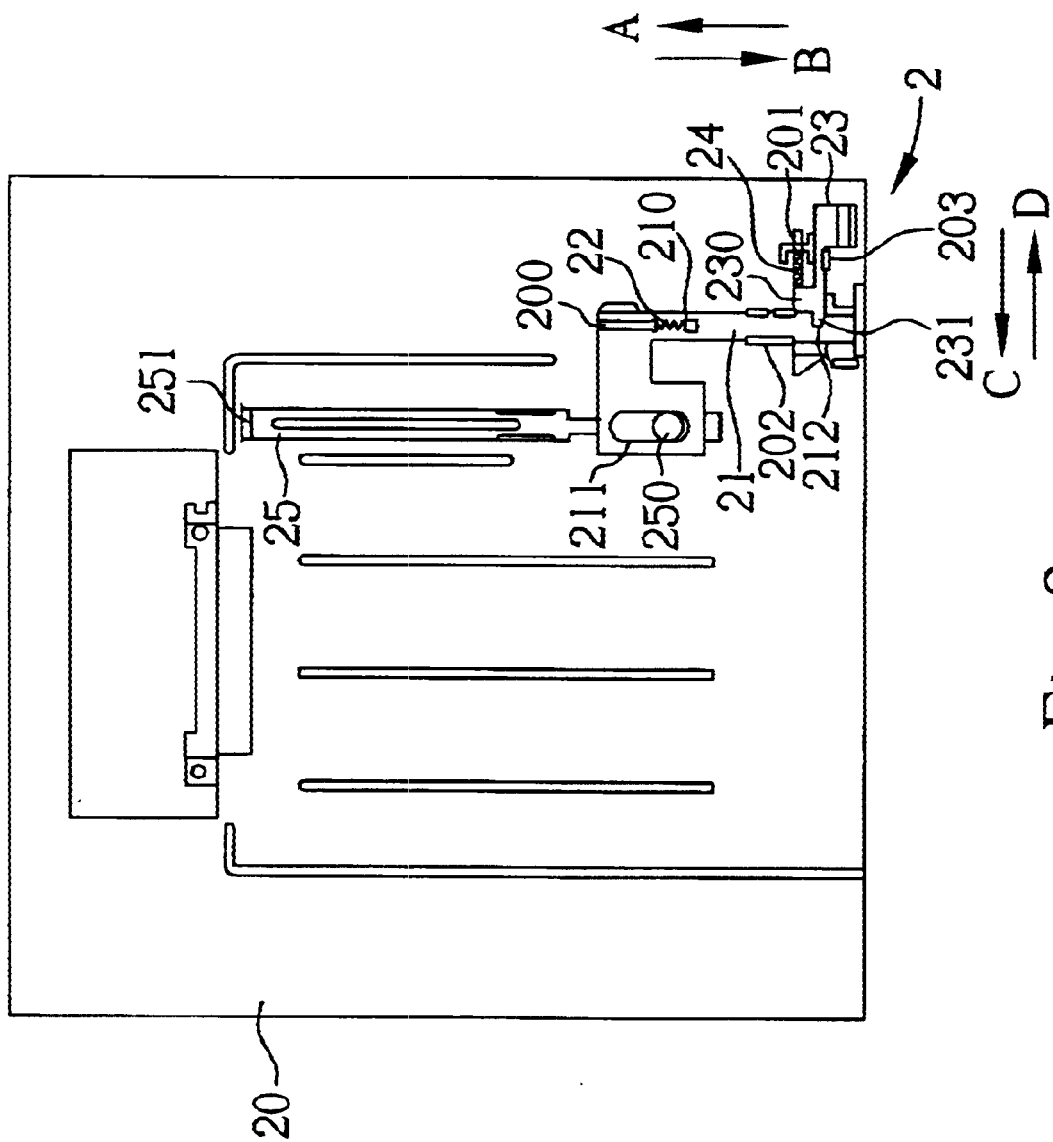
FIG. 2 is a top-plan view of an exit apparatus for computer modules that is in the first state of the first embodiment in accordance with the present invention.
Figure 3:
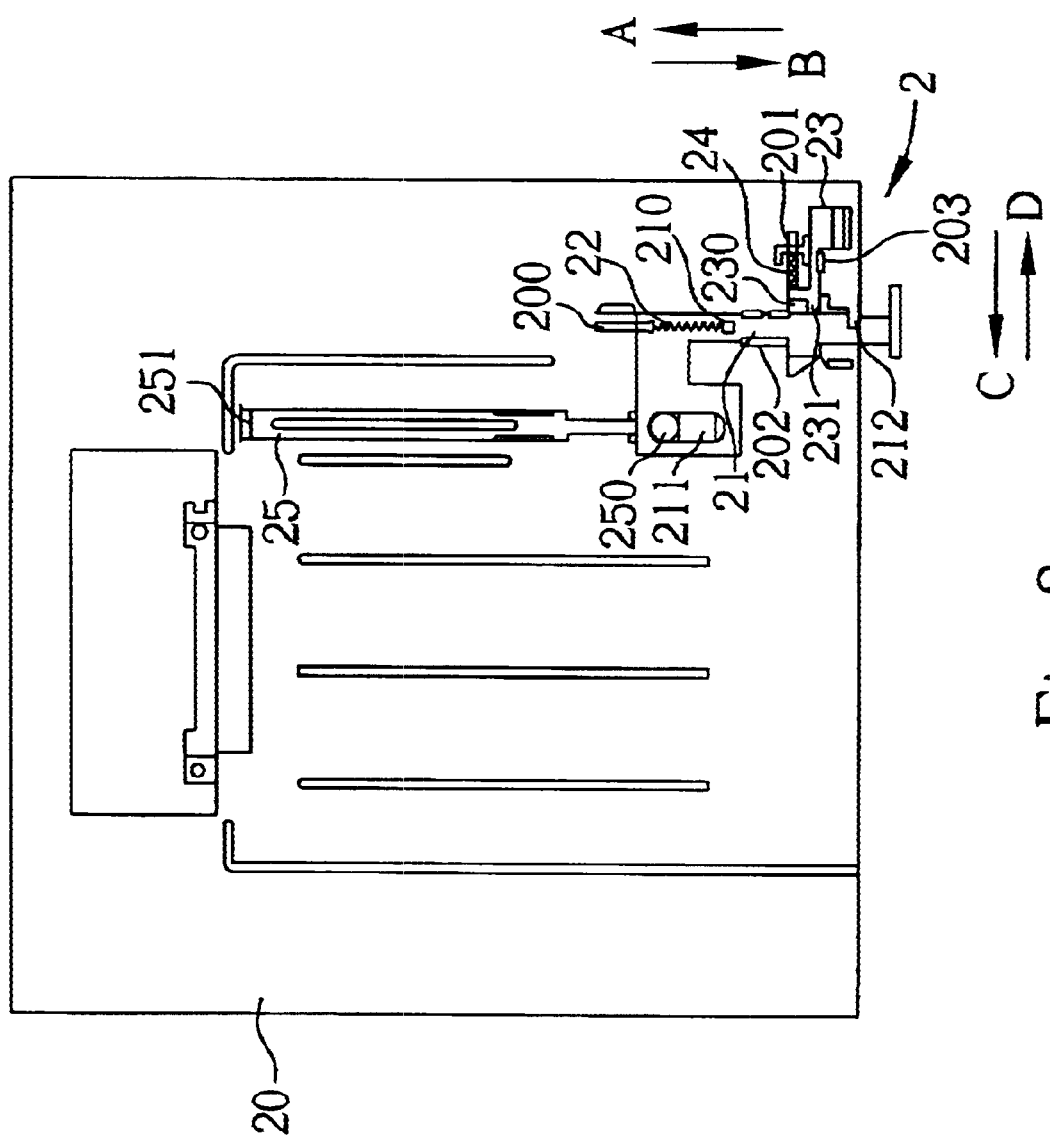
FIG. 3 is a top-plan view of an exit apparatus for computer modules that is in the second state of the first embodiment in accordance with the present invention.
Figure 4:
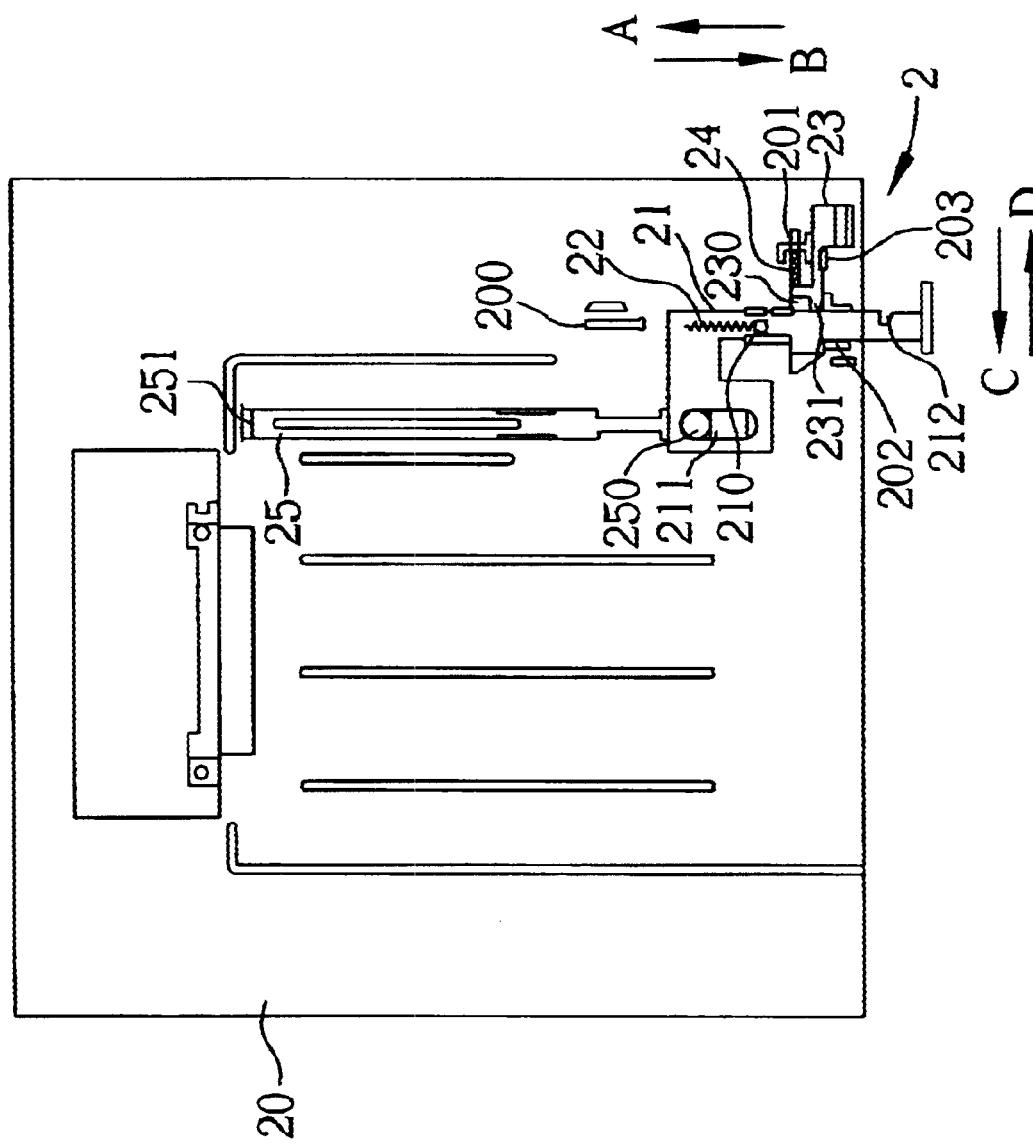
FIG. 4 is a top-plan view of an exit apparatus for computer modules that is in the third state of the first embodiment in accordance with the present invention.

FIG. 2, FIG. 3 and FIG. 4, are top-plan views showing respectively the motion of placing and exiting modules in accordance with the first embodiment of the present invention—the exit apparatus 2 of computer modules. FIG. 2 is a top-plan view of an exit apparatus 2 for computer modules 37 that is in the first state of the first embodiment in accordance with the present invention. The exit apparatus 2 comprises a first lever 21, a first elastic member 22, a second lever 23 and a second elastic member 24. The first elastic member 22 is held in a groove on the underside of the first lever 21. One end of the first elastic member 22 joins a holding section 210 of the groove and forms a free end; the other end of the first elastic member 22 joins a lug 200 located on the module-loading tray 20 and forms a fixed end. As a result, when the first lever 21 receives the pushing force in direction A, the first elastic member 22 is pressed to push the first lever 21, and therefore generates an elastic recoiling force in direction B. The first lever 21 can only be moved rectilinearly in direction A and B since it is constrained by a plurality of blocker 202, installed on the module loading tray 20 respectively along the left and right sides of the first lever 21. An elongated hole 211 is disposed on the left side of the first lever 21 and loosely buckled with a positioning button 250, which is disposed at one end of a dragging plate 25. A hooking section 251 is formed at the other end of the dragging plate 25. A second elastic member 24 is connected with a second lever 23. One end of the second elastic member 24 joins a lug 201 of the module-loading tray 20 and forms a fixed end; the other end of the second elastic member 24 is blocked by the holding section 230 of the second lever 23 and forms a free end. The second lever 23 can only be moved rectilinearly in direction C and D since it is constrained by the blocker 203 of the module-loading tray 20.

FIG. 2 shows that, when a module 37 is placed on the module-loading tray 20 and the first lever 21 is pushed towards direction A, a boss 231 of the second lever 23 locks a concavity 212 of the first lever 21, thus forming a state of equilibrium. And an elastic recoiling force is generated and pushes the first lever 21 toward direction B. Meanwhile, since one end of the second elastic member 24 is fixed by the lug 201 and the other end of the second elastic member 24 is compressed towards direction D, an elastic recoiling force toward direction C is generated.

FIG. 3 is a top-plan view of an exit apparatus 2 for computer modules that is in the second state of the first embodiment in accordance with the present invention. When the second lever 23 is pushed toward direction D through protruding section 232, thus pulling the boss 231 out of the concavity 212 of the first lever 21. Subsequently the first elastic member 22 is released and the first lever 21 is moved toward direction B accordingly, and one end of the elongated hole 211 is to come in contact with the positioning button 250 of the dragging plate 25. At this time, the positioning button 250 of the dragging plate 25 is pulled toward direction B. Then, the hooking section 251 mounted at one end of the dragging plate 25 hooks the module 37 accordingly. Thus, the user can pull the module 37 out and retrieve it as shown in FIG. 4.

If the user wants to read information from another module, the user may put another module 37 into the module-loading tray 20, and then pushes the module 37 toward the inside of the module-loading tray 20, thus the hooking section 251 holds the module 37 and is pushed into the fixed position at the inside of the module-loading tray 20, which achieves the state depicted in FIG. 3. At this time, the user pushes the first lever 21 toward direction A until the boss 231 of the second lever 23 locks into the concavity 212 of the first lever 21, thus achieving the state of equilibrium depicted in FIG. 2.

Figure 5:
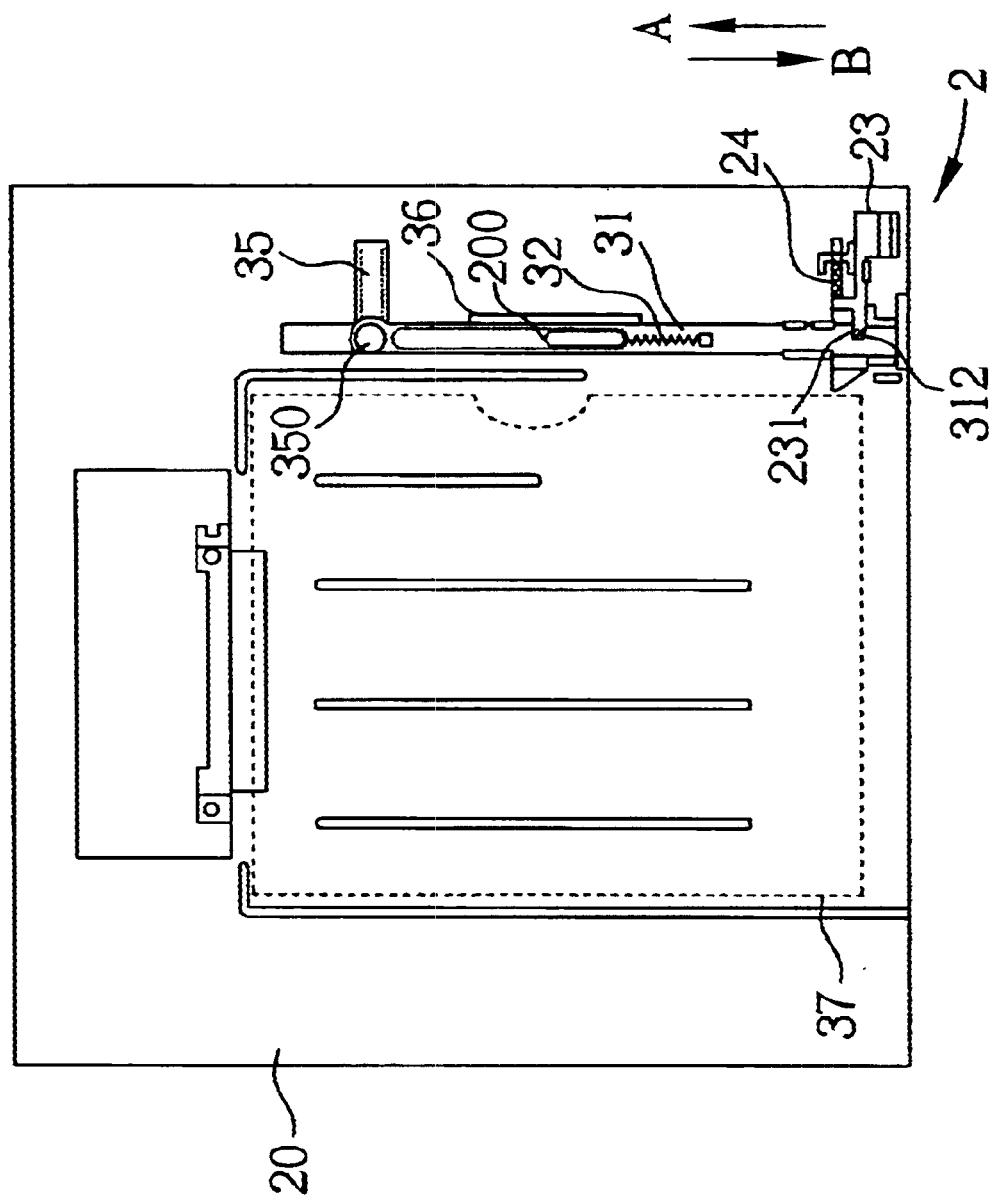
FIG. 5 is a top-plan view of an exit apparatus for computer modules that is in the first state of the second embodiment in accordance with the present invention.
Figure 6:
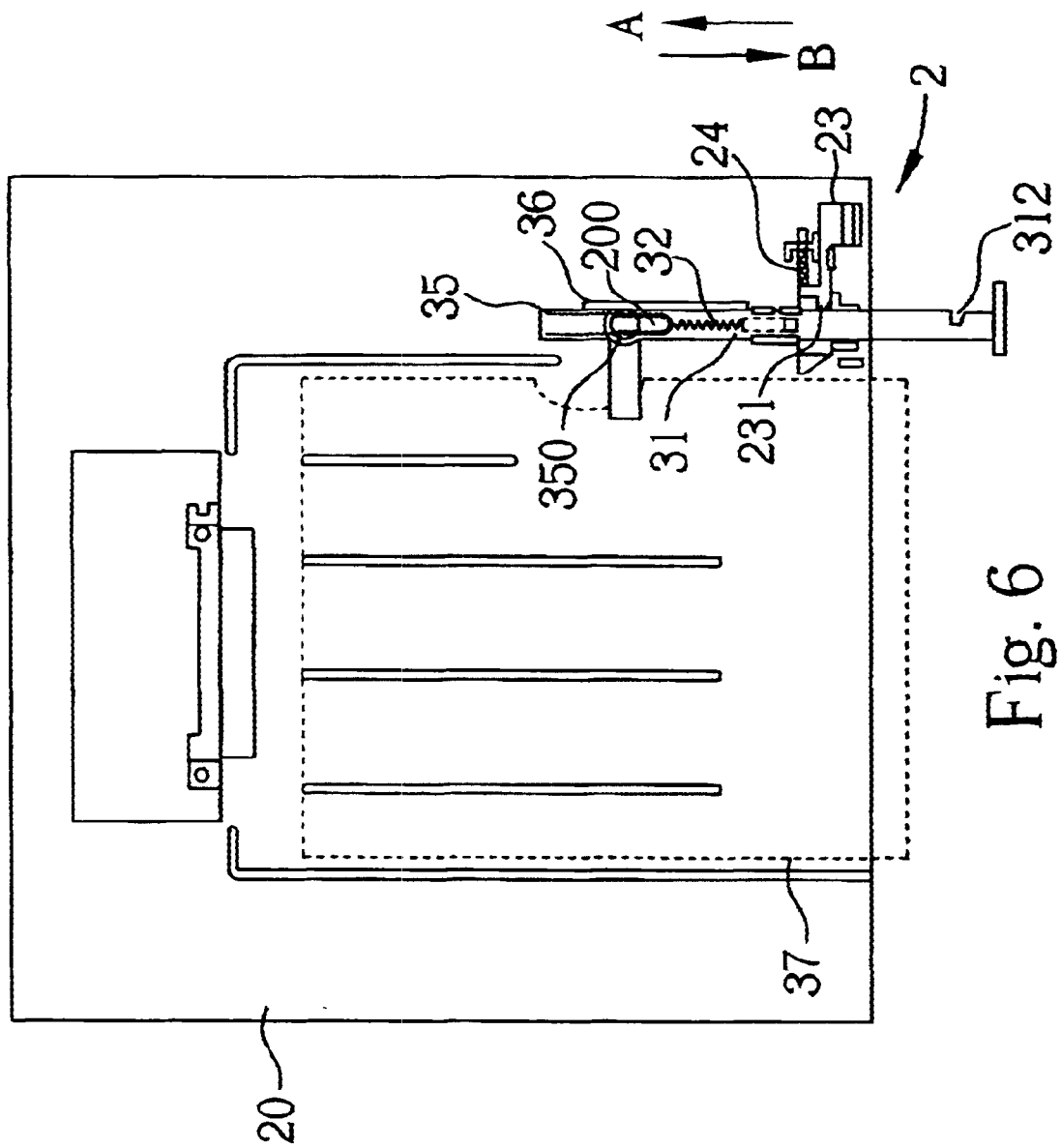
FIG. 6 is a top-plan view of an exit apparatus for computer modules that is in the second state of the second embodiment in accordance with the present invention.

The second embodiment of the present invention—the exit apparatus 2 of computer modules is depicted in FIG. 5 and FIG. 6, including a first lever 31, a first elastic member 32, a second lever 23 and a second elastic member 24. The first elastic member 32 is disposed in a concavity on the underside of the first lever 31. A lug 200 corresponding to the position of the foregoing concavity is disposed on the module-loading tray 20. One end of the first elastic member 32 is held by the lug 200 of the module-loading tray 20 and forms a fixed end; while the other end of the first elastic member 32 forms a free end. Therefore, when the first lever 31 is pushed toward direction A, the first elastic member 32 is compressed and thus generates an elastic recoiling force toward direction B. A L-shaped rotator 35 jointed at the rear end of the first lever 31 by a shaft section 350 rotates whenever the first lever 31 is pushed or pulled. FIG. 5 depicts the state of movement of the L-shaped rotator 35 when the L-shaped rotator 35 does not come in contact with a stopping section 36.

FIG. 6 depicts the state of movement of the L-shaped rotator 35 when the L-shaped rotator 35 comes into contact with the stopping section 36.

The operation of the foregoing second embodiment with a module 37 is to be further explained as follows. When the module 37 is already placed on the module-loading tray 20 as shown in FIG. 5, the user pushes the second lever 23 toward the right through the protruding section 232, thus departing the boss 231 from the concavity 312 of the first lever 31; at the same time, the first elastic member 32 is released from the compressed state and pushes the first lever 31 toward direction B. During the movement of the first lever 31, the L-shaped rotator 35 comes in contact with the stopping section 36 and rotates via shaft section 350 as shown in FIG. 6. Then, the module 37 is pulled out by hooking one section of the L-shaped rotator 35 up a recession 371 of the module 37. The levers and rotating mechanisms in the embodiment of the present invention can be made of plastic, thus reducing the production cost.

Although the present invention has been described in considerable detail with reference to certain preferred embodiments thereof, those skilled in the art can easily understand that all kinds of alterations and changes can be made within the spirit and scope of the appended claims. For example, the exit apparatus of computer modules in the present invention can be applied to electric or audio/video equipment, not solely limited to computer mainframes; modules can be common disks and cartridges, not limited to CD-ROMs. Therefore, the spirit and scope of the appended claims should not be limited to the description of the preferred embodiments contained herein.

What is claimed is:

1. An exit apparatus for computer modules disposed within a module-loading tray of a computer, comprising a first lever connected with a first elastic member; and a second lever connected with a second elastic member, wherein said second lever with an elastic force of said second elastic member locks with said first lever and causes said first elastic member to be compressed by said first lever, and when said second lever is released from said first lever, said first lever is pushed forward by the elastic force of said first elastic member, thus the user can retrieve a module from the module-loading tray.

2. An exit apparatus for computer modules as claimed in claim 1, further comprising a dragging plate connected with said first lever, and said dragging plate is actuated by said first lever.

3. An exit apparatus for computer modules as claimed in claim 1, further comprising a L-shaped mechanism pivoted on one end of said first lever; and a recession at one side of said module, wherein when said first lever moves forward, said L-shaped mechanism rotates and then hooks on said recession, therewith said module moves as said first lever.

4. An exit apparatus for computer modules disposed within a module-loading tray of a computer, comprising a first lever connected with a first elastic member; and a second lever connected with a second elastic member, wherein a dragging plate is connected with said first lever, the movement of said first lever causes said dragging plate to move in the same direction as that of said first lever, said second lever with the elastic force of said second elastic member locks with said first lever and causes said first elastic member to be compressed by said first lever, when said second lever is released from said first lever, said first lever is pushed forward by the elastic force of said first elastic member, thus the user can retrieve a module from the module-loading tray.

5. An exit apparatus for computer modules as claimed in claim 2 or claim 4, wherein said first lever connects with said dragging plate by an elongated hole, thus after said first lever is moved for a short distance the movement of said first lever causes said dragging plate moving in the same direction.

6. An exit apparatus for computer modules disposed within a module-loading tray of a computer, comprising a first lever connected with a first elastic member; and a second lever connected with a second elastic member, wherein an L-shaped mechanism is pivoted with said first lever, a recession is disposed on one side of said module, thus when said first lever moves forward, said L-shaped mechanism rotates and then hooks on said recession, therewith said module moves as said first lever, and wherein said second lever with the elastic force of said second elastic member hooks with a concavity of said first lever, and causes said first elastic member to be compressed by said first lever, when said second lever is released from said first lever, said first lever is pushed forward by the elastic force of said first elastic member, thus the user can retrieve a module from the module-loading tray.

7. An exit apparatus for computer modules as claimed in claim 1, 4 or 6, wherein a groove on the underside of said first lever contains said first elastic member, and a lug of said module-loading tray is disposed corresponding to the position of said groove, one end of said first elastic member is held by a holding section of said first lever and forms a fixed end, and the other end of said first elastic member joins said lug of said module-loading tray and forms a free end.

8. An exit apparatus for computer modules as claimed in claim 1, 4 or 6, wherein said second elastic member is connected with said second lever, and one end of said second elastic member is held by a holding section of said second lever and forms a fixed end, and the other end of said second elastic member joins said lug of said module-loading tray and forms a free end.

* * * * *